US008304070B2

(12) United States Patent
Yabuki et al.

(10) Patent No.: US 8,304,070 B2
(45) Date of Patent: Nov. 6, 2012

(54) MANUFACTURING METHOD OF SURFACE-TREATED ZINC OXIDE PARTICLES, SURFACE-TREATED ZINC OXIDE PARTICLES, DISPERSION LIQUID AND DISPERSION SOLID THEREOF, AND BASE MATERIAL COATED WITH ZINC OXIDE PARTICLES

(75) Inventors: Kayo Yabuki, Chiba (JP); Atsushi Tofuku, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 12/734,674

(22) PCT Filed: Sep. 30, 2008

(86) PCT No.: PCT/JP2008/067709
§ 371 (c)(1),
(2), (4) Date: Jul. 8, 2010

(87) PCT Pub. No.: WO2009/063702
PCT Pub. Date: May 22, 2009

(65) Prior Publication Data
US 2010/0286322 A1    Nov. 11, 2010

(30) Foreign Application Priority Data
Nov. 15, 2007    (JP) .................................. 2007-296194

(51) Int. Cl.
*B32B 5/16*    (2006.01)
*B05D 7/00*    (2006.01)
(52) U.S. Cl. ......... 428/328; 427/221; 428/333; 428/339
(58) Field of Classification Search .................. 428/403, 428/407, 323, 328, 333, 339; 427/212, 221
See application file for complete search history.

(56) References Cited

U.S. PATENT DOCUMENTS
2009/0093579 A1 *   4/2009   Kanamori et al. ............ 524/430

FOREIGN PATENT DOCUMENTS
| JP | 2002-362925 A | * | 12/2002 |
| JP | A 2002-362925 | | 12/2002 |
| JP | A 2002-363445 | | 12/2002 |
| JP | A 2006-104342 | | 4/2006 |
| JP | A 2007-092063 | | 4/2007 |
| JP | A 2007-197412 | | 8/2007 |

OTHER PUBLICATIONS

International Search Report issued in corresponding International Application No. PCT/JP2008/067709, mailed Oct. 28, 2008. (with English-language translation).

* cited by examiner

*Primary Examiner* — Hoa (Holly) Le
(74) *Attorney, Agent, or Firm* — Oliff & Berridge, PLC

(57) ABSTRACT

Zinc oxide particles having high transparency in visible light and high shielding properties in a ultraviolet region, with surface treatment of inactivating photocatalytic activity applied thereto, and a dispersion thereof. A manufacturing method of surface treated zinc oxide particles, including: a first step of mixing a dispersion liquid with zinc oxide particles dispersed in a solvent, and silicone resin having polysiloxane bond with at least one or more silicon atoms having a silanol group (Si—OH) and/or alkoxy silyl group (Si—OR, wherein R is alkyl group); obtaining a mixed solution containing a surface treated zinc oxide particles precursor, with the silicone resin adsorbed on the surface of each zinc oxide particle and the solvent, and drying and solidifying the mixed solution by applying heat treatment thereto, to thereby manufacture a dried body; and a second step of pulverizing the dried body, to thereby manufacture the surface treated zinc oxide particles.

4 Claims, No Drawings

MANUFACTURING METHOD OF SURFACE-TREATED ZINC OXIDE PARTICLES, SURFACE-TREATED ZINC OXIDE PARTICLES, DISPERSION LIQUID AND DISPERSION SOLID THEREOF, AND BASE MATERIAL COATED WITH ZINC OXIDE PARTICLES

TECHNICAL FIELD

The present invention relates to zinc oxide particles capable of exhibiting high transparency in a visible light region and high shielding properties in an ultraviolet region, and a manufacturing method of surface treated zinc oxide particles, with a surface of each particle coated with a prescribed coated film, having inactivated photocatalytic activity, the surface treated zinc oxide particles, and a dispersion liquid thereof, and a dispersion thereof.

DESCRIPTION OF RELATED ART

An ultraviolet ray absorber includes an organic ultraviolet absorber and an inorganic ultraviolet absorber, and either one of them is used in an ultraviolet shielding material, etc.

First, a benzophenone-based ultraviolet absorber and a benzotriazole-based ultraviolet absorber are known as the organic ultraviolet absorber. However, these organic ultraviolet absorbers have a problem that they are degraded when irradiated with ultraviolet ray because they are organic substances, and further they are bled out to surfaces of a coated film and a molded product due to time-series change.

Meanwhile, the zinc oxide particles are known as the inorganic ultraviolet absorbent. The zinc oxide particles exhibit optical characteristics that a scattering effect of particles is reduced by making the zinc oxide particles finer, wherein light in the visible light region is transmitted but light in the ultraviolet region is absorbed. However, the zinc oxide particles have a photocatalytic activity of exciting electrons by ultraviolet ray to cause oxidation reduction reaction together with generated holes. A contacted organic material is decomposed due to such a photocatalytic activity, and therefore the zinc oxide particles do not have stability in cosmetics, etc, and in an ultraviolet shielding material used in windows, etc, organic materials constituting filler and film are deteriorated and as a result there is a problem that weather resistance is also deteriorated.

Therefore, when the zinc oxide particles are added to resin, etc, as an inorganic ultraviolet absorber, the photocatalytic activity of the zinc oxide needs to be suppressed.

Accordingly, in order to suppress the photocatalytic activity, the following method can be considered. Namely, a hydrolysable silane monomer such as a silane coupling agent and methyl hydrogen polysiloxane: formula (1), being a kind of a reactive silicone oil disclosed in patent document 1 are used, to form a polysiloxane coated film on the surface of each zinc oxide particle.

For example, the zinc oxide particle with the polysiloxane coated film formed thereon, which is used for cosmetics, etc, can be obtained, by directly mixing the zinc oxide particles and the reactive silicone oil, or dispersing the zinc oxide particles once into solvent, then mixing the dispersion liquid and the reactive silicone oil, then removing the solvent, and thereafter heating and drying the residue after removing the solvent. Further, in the ultraviolet shielding material used in windows, etc, high transparency needs to be added to a product base material. Therefore, the zinc oxide particle powders with polysiloxane coated film formed thereon, which is obtained by the aforementioned method, are pulverized by using a medium stirring mill, etc, to thereby obtain the dispersion liquid of the zinc oxide particles with polysiloxane coated film formed thereon.

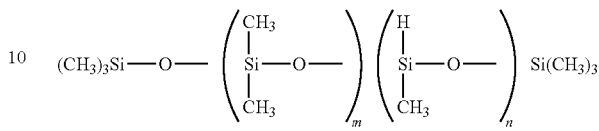

(1)

Patent document 1: Japanese Patent Laid Open Publication No. 2002-362925

DISCLOSURE OF THE INVENTION

Problem to be Solved by the Invention

However, as a result of an examination by inventors of the present invention, the following problems are clarified.

When a coated film is formed by using the hydrolysable silane monomer, it is brought into hydrolysis and polycondensation reactions by Sol-Gel processing, to thereby form the polysiloxane coated film on the zinc oxide particles. However, in order to speedily advance the hydrolysis reaction, acid catalyst such as hydrochloric acid and nitric acid, or alikali catalyst such as sodium hydroxide, potassium hydroxide, and ammonia, and water are needed, thus involving a problem that the zinc oxide particles are easily agglutinated due to pH fluctuation in a reaction process, and in the agglutinated zinc oxide particles, silane monomer is hardly brought into contact with individual zinc oxide particle uniformly.

In addition, there is a problem that condensation of surplus silane monomers is easily generated in a process of reaction, and generated olygomer causes reactions across a plurality of particles, and therefore there is a problem that a great and firm agglomeration cluster mediated by silica component is easily formed during removing/drying a solvent.

Further, mechanical strength of the formed coated film is low, and therefore damage in coated film is great in the post-step of pulverization/dispersion processing. As a result, the surface of the zinc oxide particle is partially exposed, and therefore an effect with good reproducibility is difficult.

Meanwhile, the reactive silicone oil has a structure in which straight polysiloxane is set as a main chain, with its side chain and both ends partially substituted with a reactive group. The reactive silicone oil is a high molecular weight polymer, and therefore is easily wetted to the surface of each zinc oxide particle, and a highly active group such as Si—H can be introduced in a stable state, and therefore has a merit that reactivity to the individual particle surface is high. However, the reactive silicone oil is formed in a state of a serial long chain, and therefore an influence of a solid factor is great, further the content of the reactive group that exists in a molecule is low. Accordingly, the reactive silicone oil is hardly self-condensed. Further, there is a problem that stability and a mechanical strength of the obtained coated film are deteriorated, owing to a partial exposure of the zinc oxide particle surface by damage added to the coated film during pulverization processing, because a film forming property is low (three dimensional bonding is hardly formed between polymers).

The present invention is provided under such a circumstance, and an object of the present invention is to provide zinc oxide particles and a dispersion of them, capable of exhibiting high transparency in a visible light region and high shielding properties in an ultraviolet region.

Means for Solving the Problem

In order to achieve the above-described object, inventors of the present invention use zinc oxide particles with each surface treated by silane compound (described as "surface treated zinc oxide particles" in some cases in the present invention) and dispersion thereof. Thus, the present invention is completed.

Namely, a first invention for solving the above-described problem is a manufacturing method of surface treated zinc oxide particles, including:

a first step of mixing a dispersion liquid with zinc oxide particles dispersed in a solvent, and silicone resin having polysiloxane bond with at least one or more silicon atoms having a silanol group (Si—OH) and/or alkoxy silyl group (Si—OR, wherein R is alkyl group); then obtaining a mixed solution containing a surface treated zinc oxide particles precursor, with the silicone resin adsorbed on the surface of each zinc oxide particle and the solvent, and drying and solidifying the mixed solution by applying heat treatment thereto, to thereby manufacture a dried body; and a second step of pulverizing the dried body, to thereby manufacture the surface treated zinc oxide particles.

A second invention is the manufacturing method of the surface treated zinc oxide particles according to the first invention, wherein temperature of the heat treatment is 200° C. or less.

A third invention is the surface treated zinc oxide particles, which are obtained through the surface treated zinc oxide particles precursor and further through the dried body according to either the first or second invention.

A fourth invention is the surface treated zinc oxide particles according to the third invention, wherein photocatalytic activity is inactivated.

A fifth invention is the surface treated zinc oxide particles according to the third or fourth invention, wherein a particle diameter is 1 to 800 nm.

A sixth invention is the surface treated zinc oxide particles according to any one of the third to fifth inventions wherein a molecule amount of the silane compound is 100 to 100000.

A seventh invention is the surface treated zinc oxide particles according to any one of the third to sixth inventions, wherein 5 to 200 pts.wt. of the silicone resin is contained, with respect to 100 pts.wt. of the zinc oxide particles.

An eighth invention is zinc oxide particles dispersion liquid, wherein the surface treated zinc oxide particles according to any one of the third to seventh inventions are dispersed in a liquid medium.

A ninth invention is the zinc oxide particles dispersion liquid according to the eighth invention, wherein the liquid medium contains resin.

A tenth invention is the zinc oxide particles dispersion liquid according to any one of the eighth or ninth invention, wherein the liquid medium is an organic solvent.

An eleventh invention is a zinc oxide particles dispersion, wherein the surface treated zinc oxide particles according to any one of the third to seventh inventions are dispersed in a solid medium.

A twelfth invention is the zinc oxide particles dispersion according to the eleventh invention, wherein the solid medium is either resin or glass.

A thirteenth invention is the zinc oxide particles dispersion according to either eleventh or twelfth invention, wherein the solid medium is a film or a board with a thickness of 0.1 μm to 50 mm.

A fourteenth invention is zinc oxide particles dispersion powders, wherein the surface treated zinc oxide particles according to any one of the third to seventh inventions are dispersed in the solid medium, and the solid medium is in a state of powders.

A fifteenth invention is a zinc oxide particles coating base material, wherein a coated film is provided, containing the surface treated zinc oxide particles according to any one of the third to seventh inventions.

A sixteenth invention is the zinc oxide particles coating base material according to the fifteenth invention, wherein the coated film containing the surface treated zinc oxide particles are composed of only the surface treated zinc oxide particles.

A seventeenth invention is the zinc oxide particles coating base material according to the fifteenth invention, wherein the coated film containing the surface treated zinc oxide particles includes the surface treated zinc oxide particles, and resin or glass.

Advantage of the Invention

The surface treated zinc oxide particles according to the present invention are inorganic particles having ultraviolet shielding ability, capable of exhibiting high transparency in a visible light region and high shielding properties in a ultraviolet region. Further, the photocatalytic activity of the surface of each zinc oxide particle is inactivated by coating the surface of the zinc oxide particle with a silane compound, and a base material coated with the zinc oxide particles, the zinc oxide particles dispersion liquid, and the zinc oxide particles dispersion of the present invention exhibit excellent visible light transparency and ultraviolet shielding performance and also exhibit a high suppression effect to catalytic activity.

BEST MODE FOR CARRYING OUT THE INVENTION (1) Manufacturing method of the zinc oxide particles, (2) Surface treated zinc oxide particles and the manufacturing method of the same, (3) Zinc oxide particles dispersion liquid, (4) Zinc oxide particles dispersion, and (5) base material coated with zinc oxide particles, will be specifically described in this order.

(1) Manufacturing Method of the Zinc Oxide Particles

The manufacturing method of the zinc oxide particles will be described, based on examples of the manufacturing method.

There is a method wherein precipitate is generated from zinc aqueous solution and alkaline aqueous solution, which is then matured and wetted by alcohol, and drying is started thereto, to thereby obtain a zinc oxide particles precursor. Next, the zinc oxide particles precursor is calcinated, to obtain the zinc oxide particles.

Here, a zinc compound for preparing the zinc aqueous solution is not particularly limited, and for example, zinc nitrate, zinc chloride, zinc acetate, and zinc sulfate, etc, can be given. However, nitrate salt is preferable in terms of easiness of removing impurities.

Meanwhile, the alkaline aqueous solution is not particularly limited, and for example, aqueous solutions such as sodium hydroxide, potassium hydroxide, ammonium hydrogen carbonate, and ammonia can be given. Alkaline concentration of the sodium hydroxide in the alkaline aqueous solution is preferably set to excess amount of 1.0 to 1.5 times a chemical equivalent amount necessary for the zinc compound to be hydroxide. This is because when the alkaline concentration is set to be the chemical equivalent amount or more, charged zinc compound can be reacted, and in a case of 1.5 times excess amount or less, washing time for removing residual alkali is not prolonged.

Next, generation and maturity of the precipitate will be described.

The generation of the precipitate is performed by dropping the aqueous solution of the zinc compound, into the continuously stirred alkaline aqueous solution. By dropping the aqueous solution of the zinc compound into the alkaline aqueous solution, the concentration reaches saturation instantaneously and the precipitate is generated, to thereby obtain the precipitate of particles of zinc carbonate and zinc carbonate hydroxide having uniform particle diameters. It is difficult to obtain the precipitate of the zinc carbonate and the zinc carbonate hydroxide having aforementioned aligned particle size, even if the alkaline solution is dropped or parallel-dropping of the solution of the zinc compound and the alkaline solution is performed, into the aqueous solution of the zinc compound.

The temperature of the alkaline aqueous solution during generating the precipitate is not particularly limited. However, the temperature is set to 50° C. or less and preferably a room temperature. A lower limit of the temperature of the alkaline aqueous solution can not be defined. However, when the temperature is excessively low, a new cooling device is required, and therefore the temperature not requiring such a device is preferable. The dropping time of the zinc compound aqueous solution into the alkaline aqueous solution is set to less than 30 minutes, preferably 20 minutes or less, and further preferably 10 minutes or less, from the viewpoint of productivity. After completion of dropping, the precipitate is continuously stirred and is matured to achieve equalization in the system after completion of the drop. The temperature for maturation is set to be the same as the temperature for generating the precipitate. Further, the time for continuously stirring the solution is not particularly limited. However, the time is set to 30 minutes or less and preferably set to 15 minutes or less from the viewpoint of productivity.

The precipitate obtained after maturity is washed by decantation. However, the precipitate is sufficiently washed until conductivity after washing reaches 1 mS/cm or less. This is because desired ultraviolet shielding characteristics can be obtained, in a case of little impurities such as chlorine ion, nitrate ion, sulfate ion, and acetate ion, which are remained in the particles. Accordingly, sufficient washing is preferable, until the conductivity of supernatant liquid after washing reaches 1 mS/cm or less (corresponding to 1.5% or less of the residual impurity amount).

Next, the washed precipitate is subjected to wet treatment by alcoholic solution to thereby obtain a wet treated product, and thereafter, the wet treated product is dried to thereby obtain a zinc oxide particles precursor. Then, the zinc oxide particles precursor is dried, to thereby obtain the zinc oxide particles. By performing the wet treatment, agglomeration of the zinc oxide particles precursor after drying can be avoided.

Alcohol concentration of the alcoholic solution is preferably set to 50 mass % or more. When the alcohol concentration is 50 mass % or more, the zinc oxide particles are prevented from becoming strong aggregate, and excellent dispersability can be exhibited.

The alcoholic solution used in the wet treatment will be described. Alcohol used in the alcoholic solution is not particularly limited. However, alcohol that dissolves into water and having a boiling point of 100° C. or less is preferable. For example, methanol, ethanol, propanol, and tert-butyl alcohol can be given.

The wet treatment will be described. The wet treatment is performed by charging the filtered and washed precipitate into the alcoholic solution, and the time and a stirring speed at this time may be suitably selected according to a treatment amount. The amount of the alcoholic solution when the precipitate is charged into the alcoholic solution may be determined if the precipitate can be easily stirred and flowability can be secured. The stirring time and the stirring speed are suitably selected under a condition that the precipitate including a partially agglomerate part during filtering and washing as described above, is uniformly mixed until the agglomerate part is dissolved in the alcoholic solution.

Further, the wet treatment may be performed under normal room temperature. However, the wet treatment can also be performed while increasing the temperature so that alcohol is not evaporated and lost. Preferably, disappearance of the alcohol during wet treatment can be avoided and disappearance of the effect of the wet treatment can be avoided, by heating at a temperature of not more than the boiling point of the alcohol. By keeping existence of the alcohol during wet treatment, the effect of the wet treatment can be obtained and also the precipitate after drying is not turned into the strong aggregate, and this is preferable.

Drying of the wet treated product will be described. Drying conditions of the drying temperature and time are not particularly limited, and heating and drying may be started in a state that the wet treated product is dipped into alcohol. The precipitate is not turned into the strong aggregate even if heating and drying are performed after the wet treatment. Therefore, the drying condition may be suitably selected, depending on a treating amount of the wet treated product and a treatment device.

The zinc oxide particles precursor subjected to wet treatment was obtained by drying. The precursor has a mixed phase of $ZnCO_3$ and $Zn_5(CO_3)_2(OH)_6$, and the ratio of (104) XRD peak intensity of $ZnCO_3$, to (200) XRD peak intensity of $Zn_5(CO_3)_2(OH)_6$ is 0.9 or more. Particularly, by setting the ratio of (104) XRD peak intensity of $ZnCO_3$, to (200) XRD peak intensity of $Zn_5(CO_3)_2(OH)_6$ to 0.9 or more, satisfied values can be obtained in crystalline diameter, specific surface area, and average particle diameter of each zinc oxide particle after calcination, and therefore desired optical characteristics can be exhibited by the ultraviolet shielding body manufactured by using the zinc oxide particles.

Meanwhile, alcoholic solution containing one or more kinds of elements selected from Si, Al, Zr, and TI in a range of exceeding 0 wt % and 15 wt % or less in terms of its oxide, may also be used. Preferable examples of the alcoholic solution are given in the same way as the aforementioned examples. With this structure, compounds of Si, Al, Zr, and Ti are independently scattered between $ZnCO_3$ and $Zn_5(CO_3)_2(OH)_6$ generated by dropping the zinc compound solution, thus making it possible to inhibit a particle growth of the zinc oxide generated by heat treatment. Then, when the content of these elements is 15 wt % or less in terms of its oxide, reduction of the content ratio of the relative zinc oxide caused by adding these elements can be avoided. Therefore, the ultraviolet shielding characteristics can be maintained and a shielding force can be maintained.

The dried zinc oxide precursor is subjected to calcinations, for improving the ultraviolet shielding characteristics and the shielding force. The calcinations is performed under any kind of the atmosphere, such as in the atmosphere, in the inert gas such as nitrogen, argon, and helium, and in the mixed gas of the inert gas and reducing gas such as hydrogen. The treatment temperature at this time is preferably set to 350° C. or more as a lower limit, and 500° C. or more as an upper limit, from the viewpoint of the desired ultraviolet shielding characteristics. The treatment time at this time may be suitably selected according to the treating amount and the calcinating temperature of the zinc oxide precursor.

According to the example of the manufacturing method of the zinc oxide particles as described above, the zinc oxide particle having the crystalline diameter of 16 nm to 20 nm, the specific surface area of less than 25 m²/g to 55 m²/g, and the average particle diameter of 19 nm to 41 nm, can be obtained. Wherein, the average particle diameter is a value obtained from d=6/ρ·S (d; particle diameter, ρ; true density, S; specific surface area).

(2) Surface Treated Zinc Oxide Particles and the Manufacturing Method of the Same The surface treated zinc oxide particles according to the present invention can be obtained by coating the surface of each zinc oxide particle with silicone resin. The manufacturing method of the surface treated zinc oxide particles according to the present invention will be described hereafter.

The manufacturing method of the surface treated zinc oxide particles according to the present invention includes the first step and the second step.

The first step is the step of mixing a dispersion liquid with the zinc oxide particles dispersed in a suitable solvent, and a silicone resin, to thereby obtain a mixed solution including a precursor with the silicon resin adsorbed on the surface of each zinc oxide particle and the solvent, and obtaining a dried and solidified product by applying heat treatment to the mixed solution. Namely, by adding the silicone resin to the dispersion liquid of the zinc oxide particles, which is then mixed and stirred, to thereby obtain the surface treated zinc oxide particles precursor, with the surface of each zinc oxide particle coated with the silicon resin. The dried and solidified product is obtained by suitably removing the solvent from the mixed solution and applying heat treatment thereto. There is no problem in performing the removal of the solvent and the heat treatment simultaneously. By performing the heat treatment, stability of a silicon resin coated film coated with the zinc oxide particles can be increased. Note that the dried and solidified product is a secondary particle of the surface treated zinc oxide particles.

In the first step, a single dispersion state is preferably maintained by dispersing the zinc oxide particles in a suitable solvent. The single dispersion state is maintained for the purpose of preventing a state that the photocatalytic activity can not be inhibited in an exposed part, because a surface of the zinc oxide particles not having the silicone resin coated film is exposed after passing through a pulverization step of the second step as will be described later, even if the agglomerated zinc oxide particles are coated with the silane compound, when the zinc oxide particles are agglomerated.

The second step is the step of pulverizing the dried and solidified product obtained by the first step, to thereby obtain the surface treated zinc oxide particles. Namely, the second step is the step of pulverizing the dried and solidified product, being secondary particles of the surface treated zinc oxide particles obtained by the first step, to thereby obtain primary particles. Dry-type or wet-type pulverization processing so as not to damage the surface of each surface treated zinc oxide particle, is an important step for obtaining clear transparency in the zinc oxide particles as will be described later. A publicly-known pulverizer can be used for pulverization, and for example, a ball mill, a jet mill, and a medium stirring mill can be given.

In this step as well, the surface treated zinc oxide particles are preferably not agglomerated. In this stage, when the surface treated zinc oxide particles are agglomerated, scattering occurs in the visible light region (wavelength of 400 to 780 nm) by geometric scattering or diffraction scattering, then the silicone resin coated film is turned into a frosty glass and so forth, and the transparency (haze), etc, is influenced thereby. Therefore, a suitable condition needs to be selected so as not to add damage such as peel-off, to the coated film on the surface of the surface treated zinc oxide particle. The surface treated zinc oxide particles according to the present invention can be obtained by passing through the aforementioned step.

It is preferable that the silicone resin according to the present invention has a three-dimensional siloxane bond as a main frame, and is a high molecular weight polymer as shown in the following formulas (2) and (3), with a part of the molecular end blocked by alkoxy silyl group (Si—OR) and/or silanol group (Si—OH), and methyl group and/or phenyl group as organic substituted groups.

Namely, a part of the silicon atoms constituting the three-dimensional siloxane bond has OR group and/or OH group, and further a part of the silicon atoms constituting outermost side of the silicone resin molecule also has the OR group and/the OH group, and therefore the silicone resin has the OR group and/or the OH group facing outward of the silicon resin molecule.

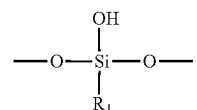

(2)

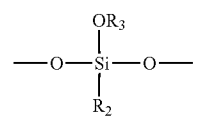

(3)

R1 and R2 are alkyl group or phenyl group.
R1 and R2 may be mutually the same groups or may be different groups.
R3 is the alkyl group.

The silicone resin contains much more alkoxy silyl groups and silanol groups in the molecule than reactive silicone oil. Therefore, owing to high self-condensing performance, the silicone resin has excellent film forming property, and there is no necessity for adding an acidic (or basic) catalyst for promoting hydrolysis and polycondensation reactions like a hydrolyzable silane monomer. Accordingly, pH fluctuation of a system in a process of surface treatment is small, and therefore dispersability of the zinc oxide particles is not damaged.

As a result, uniform coating processing with high reproducibility can be applied to the surface of the individual zinc oxide particle. Further, by introducing the methyl group and the phenyl group into the molecule as the organic groups, flexibility can be given to a cured coated film by the silicone resin, thus making it possible to increase the mechanical strength of the coated film, and a coating damage in the second step of the pulverization/dispersion processing can be suppressed. As a result, the silicone resin coated film can exhibit excellent surface treatment effect, in inactivation of the photocatalytic activity of the zinc oxide particles.

Here, inactivation of the photocatalytic activity means that the haze value is not increased without deteriorating the medium, by suppressing own photocatalytic action of the surface treated zinc oxide particles dispersed in the medium (for example the ultraviolet curing resin). According to the examination by the inventors of the present invention, it can be said that the photocatalytic activity is inactivated, provided that the increase of the haze value of the dispersion solid is suppressed to 5% or less, during SUV irradiation of 20 hours under ultraviolet irradiation of 150 mW/cm$^2$ or less, when the ratio of the surface treated zinc oxide particles to the ultraviolet curing resin is expressed by ZnO: ultraviolet curing resin=1:4.3, and ultraviolet transmittance of the obtained dispersion solid is within 20%.

Regarding the increase of the haze value during SUV irradiation of 20 hours, the surface treated zinc oxide particles using the silicone resin, and the zinc oxide particles obtained by the first step and the second step by using hydrogen polysiloxane according to the conventional technique, are compared. Then, it is found that the increase of the haze value in a case of using the silicone resin can be suppressed to 5% or less, but in a case of using the hydrogen polysiloxane, the increase of the haze value exceeds 5%, thereby showing that in the surface treated zinc oxide particles obtained by using the silicone resin, the surface treatment effect is maintained even if passing through the mixture and heating of the first step and the pulverization of the second step. Meanwhile, in a case of using the hydrogen polysiloxane, the surface treatment effect is lost by passing through the first step and the second step.

In addition, the zinc oxide particles in the dispersion solid have higher photocatalytic activity, as the particles become finer, and the medium is deteriorated by the photocatalytic action, to thereby generate scattering at the interface between the particles and the medium. Therefore, the haze value in the dispersion solid is increased. However, by inactivating the photocatalytic activation, the surface treated zinc oxide particles can suppress the increase of the haze value of the dispersion solid, etc, and as a result, the dispersion solid, etc, excellent in weather resistance can be obtained.

Any kind of method may be acceptable as a dispersion method of the zinc oxide particles, provided that the particles are uniformly dispersed in the solvent, and for example, there is a method by a medium stirring mill, a ball mill, a sand mill, and ultrasonic dispersion, etc.

The solvent of the dispersion liquid is not particularly limited, and for example, each kind of general solvent or organic solvent such as water, alcohol, ether, ester, ketone, and an aromatic compound can be used.

As a removing method of the solvent, a filter press method, an ultrafiltration method, and a publicly known method, etc, can be given other than an evaporation method. However, the method is not limited thereto.

As a raw material of ultraviolet shielding products, the surface treated zinc oxide particles of the present invention can be used in a state of the surface treated zinc oxide particles as they are, or in a state of being dispersed into a liquid medium or a solid medium.

200° C. or less is preferable and 150° C. or less is particularly preferable as the heat treatment temperature. When the temperature is excessively high, the organic group introduced into a surface treatment agent (methyl group and/or phenyl group) is desorped due to thermal decomposition, and therefore the mechanical strength of the coated film is deteriorated. A lower limit temperature, heating time, and heating atmosphere (including vacuum state) are not particularly limited, provided that the solvent is evaporated.

The molecular amount of the silicone resin is preferably 100 to 100,000, and more preferably is 500 to 10000. If the molecular amount is 100 or more, an expected effect can be obtained, and in a case of 100,000 or less, viscosity is not excessively higher, thus making it possible to avoid a situation that the dispersability of the zinc oxide particles is interrupted.

The content of the silicone resin is preferably 5 pts.wt. to 200 pts.wt, with respect to 100 pts.wt. of the zinc oxide particles, and further preferably 10 to 100 pts.wt. The effect of coating the surface can be obtained if the content of the silicone resin is 5 pts.wt. or more, then a suppression effect of the photocatalytic activity can be sufficiently exhibited, and a dispersion effect also can be sufficiently exhibited. Further, if the content of the silicone resin is 200 pts.wt. or less, an amount of adsorption of the silicon resin on the zinc oxide particles can be set to a prescribed amount or less. By setting the amount of the adsorption of the silicon resin on the zinc oxide particles, to a prescribed amount or less, the dispersion effect is prevented from being in a saturation state in a treatment liquid. Therefore such a content of silicon resin is advantageous in terms of cost, and also the zinc oxide particles are prevented from being easily granulated through the silane compound, being a surface treatment agent, during removing the solvent. Therefore, excellent transparency can be obtained, and extension of a pulverization processing time can be avoided. From this viewpoint also, such a content of silicon resin is advantageous in terms of cost.

The particle diameter of each surface treated zinc oxide particle can be suitably selected, depending on its purpose of use. When efficient shielding of ultraviolet rays is performed while maintaining the transparency, preferably, each particle has the particle diameter of 800 nm or less. When the surface treated zinc oxide particle used in the present invention has a particle diameter of 800 nm or less, a phenomenon of shielding the light by scattering can be avoided. This is because if the particle diameter is small, it is possible to prevent a situation in which the lights with a wavelength of 400 to 780 nm are scattered by geometric scattering or diffraction scattering, and the dispersion solid, etc, in which the particles are dispersed, appears to be a frosty glass, thus losing clear transparency. Particularly, when the transparency of the visible light region is emphasized, the particle diameter is preferably set to 200 nm or less, and more preferably set to 100 nm or less. This is because if the particle diameter is 200 nm or less, the scattering is reduced to become Mie scattering or Rayleigh scattering. Particularly, if the particle diameter is reduced to a Rayleigh scattering region, the scattered lights are reduced inversely proportionally to 6 times multiplication of the dispersion particle diameter, and therefore the scattering is reduced, with reduction of the particle diameter, and the transparency is improved. Accordingly, if the particle diameter is 100 nm or less, the scattered lights are preferably extremely reduced.

Meanwhile, if the particle diameter is 1 nm or more, industrial manufacture is facilitated.

(3) Zinc Oxide Particles Dispersion Liquid

The zinc oxide particles dispersion liquid according to the present invention is a dispersion liquid in which the surface treated zinc oxide particles are dispersed in a liquid medium. As the liquid medium, organic solvents such as alcohol, ether, ester, ketone, and aromatic compound, or water can be used. Further, a binder resin can also be contained in the liquid medium. Here, the liquid medium containing the binder resin means the liquid medium in which the binder resin is dissolved, or the liquid medium in which the binder resin is dispersed like latex. Stylene resin, acrylic resin, cellulose derivative, urethane resin, melamine resin, epoxy resin, and phenol resin, etc, can be used in the binder resin. Further, a publicly-known ultraviolet curing resin, a dispersant, or an antifoaming agent may also be added.

In order to obtain the zinc oxide particles dispersion liquid, the surface treated zinc oxide particles are dispersed in the liquid medium, and publicly-known methods such as medium stirring mill, ball mill, sand mill, and ultrasonic dispersion can be used. Further, in the second step of pulverizing the surface treated zinc oxide particles, the zinc oxide dispersion liquid in which the surface treated zinc oxide particles are dispersed in the liquid medium, can be obtained by a desired liquid medium and by wet-type pulverization.

(4) Zinc Oxide Particles Dispersion

The zinc oxide particles dispersion according to the present invention is the dispersion in which the surface treated zinc oxide particles are dispersed in the solid medium. The zinc oxide particles dispersion may be formed as a bulk body and the bulk body may be made into zinc oxide particles dispersion powders by making the bulk body into powders by a publicly-known mechanical pulverization method or a method of melting, spraying, and quenching the bulk body. In this case, the particle diameter of the zinc oxide particles dispersion powders can be selected suitably for processing in the next step.

Resin or glass, etc, can be used in the solid medium. As the resin, fluorine resin, polyethylene terephthalate resin, acrylic resin, polyamide resin, vinyl chloride resin, polycarbonate resin, olefin resin, stylene resin, cellulose derivative, urethane resin, melamine resin, polyimide resin, and phenol resin, etc, can be used. The glass can be obtained by a publicly-known Sol-Gel method.

Manufacturing methods of the zinc oxide particles dispersion include: a method of kneading the surface treated zinc oxide particles into the resin, etc, by a publicly-known method such as roll kneading; a method of kneading the surface treated zinc oxide particles dispersion liquid and the resin; and a method of removing the liquid medium in the zinc oxide particles dispersion liquid containing the binder resin.

Further, a publicly-known plastic additive agent such as a dispersant and a plasticizer can also be added. Further, the zinc oxide particles dispersion having viscosity can also be obtained by suitably selecting the plastic additive agent and a glass transition point of the resin.

The zinc oxide particles dispersion in a liquid state or a solid state can be easily manufactured by dissolving the zinc oxide particles dispersion into a suitable liquid solvent or kneading the zinc oxide particles dispersion and a resin pellet, etc.

The zinc oxide particles dispersion may be made into a film or a board with a thickness of 0.1 μm to 50 mm.

It may be also possible that the surface treated zinc oxide particles and the resin are heated, mixed, and kneaded at a temperature (around 200 to 300° C.) in the vicinity of the melting point of the resin, then made into pellet, and the film or the board is formed in each system. For example, the film or the board can be formed by an extrusion method, an inflation method, a solution casting method, and a casting method, etc. The thickness of the film or the board at this time may be suitably set, depending on the purpose of use. Blending amount of the surface treated zinc oxide particles may be variable according to the thickness of the base material and required optical characteristics and mechanical characteristics. However, the blending amount is preferably set to 50 pts.wt. or less, with respect to 100 pts.wt. of the resin.

If the blending amount of the surface treated zinc oxide particles is 50 pts.wt. or less, granulation of the particles in a resin matrix can be avoided, and therefore excellent transparency can be maintained. Further, charging amount of the surface treated zinc oxide particles can be controlled, and this is advantageous in terms of cost.

The resin matrix of the film or the board is not particularly limited, and can be selected according to the purpose of use. However, the fluorine resin, polyethylene terephthalate resin, acrylic resin, polyamide resin, vinyl chloride resin, polycarbonate resin, olefin resin, epoxy resin, and polyimide resin, etc, can be given as preferable examples as the resin matrix. The fluorine resin is effective in consideration of the weather resistance.

(5) A Base Material Coated with Zinc Oxide Particles

The base material coated with the zinc oxide particles is characterized by forming a coated film on the surface of a base material, containing the surface treated zinc oxide particles. There are two cases of forming the coated film on the surface of the base material coated with the zinc oxide particles, such as a case of forming the coated film only by the surface treated zinc oxide particles, and a case of forming the coated film containing resin or glass and the surface treated zinc oxide particles. Here, the resin refers to the binder resin in the zinc oxide particles dispersion liquid, and the resin of the solid medium in the zinc oxide particles dispersion. Note that although the coated film is formed only by the surface treated zinc oxide particles, it does not mean that unavoidable impurities are not contained.

The manufacturing method of the base material coated with the zinc oxide particles includes a method of coating the surface of the base material, with the zinc oxide particles dispersion, and drying and removing the liquid medium. Further, the base material coated with the zinc oxide particles can also be manufactured by the manufacturing method of flowing, cooling, and solidifying the melted zinc oxide particles dispersion on the surface of the base material. Moreover, the base material coated with the zinc oxide particles can be manufactured by sticking film-like zinc oxide particles dispersion to the surface of the base material.

Meanwhile, the quality of the base material of the base material coated with the zinc oxide particles according to the present invention is not particularly limited, provided that it is a transparent body. However, glass or a resin sheet, and a resin film are preferably used.

The quality of the resin film is not particularly limited, provided that no trouble is generated in a required surface state and durability of the film. As preferable specific examples, a film made of transparent polymer can be given, such as polyester-based polymer such as polyethylene telephthalate and polyethylene naphthalate, cellulose-based polymer such as diacetyl cellulose and triacetyl cellulose, polycarbonate-based polymer, acrylic polymer such as polymethyl methacrylate, polystylene, acrylonitrile stylene copolymer, olefin-based polymer such as polyethylene, polypropylene, polyolefin having annular or norbornene structure, and ethylene propylene copolymer, vinyl chloride polymer, amide-based polymer such as aromatic polyamide, imide-based polymer, sulfone-based polymer, polyether sulfone-based polymer, polyether ether ketone-based polymer, polyphenylene sulfide-based polymer, vinyl alcohol-based polymer, vinylidene chloride-based polymer, vinyl butyral-based polymer, arylate-based polymer, polyoxy methylene-based polymer, epoxy-based polymer, and further binary and ternary each kind of copolymer, graft copolymer, and blended products. Particularly, a polyester biaxially oriented film such as polyethylene telephthalate, polybutylene telephthalate, or polyethylene-2,6-naphthalate is suitable from the viewpoint of the mechanical characteristics, optical characteristics, heat resistance, and economic efficiency. Note that copolymer polyester-based polyester biaxially oriented film may also be acceptable.

As described above in detail, by using the surface treated zinc oxide particles, products such as film or board, coated film, and adhesive film having ultraviolet shielding performance can be obtained.

When such ultraviolet shielding products are applied to a product, being a window material of each kind of building or vehicle, which is capable of shielding the lights of an ultraviolet region while sufficiently taking-in a visible light and expected to shield the ultraviolet ray while maintaining brightness, such a request can be satisfied. Further, when such ultraviolet shielding products are used in the coated film of the building exposed to the ultraviolet ray outdoors and the vehicle such as an automobile, such building and vehicle can be protected from the ultraviolet ray.

EXAMPLES

The present invention will be described in detail by examples and comparative examples hereafter. However, the present invention is not limited to the following examples.

Example 1

3200 g of isopropyl alcohol, and 800 g of zinc oxide particles (ZnO produced by SUMITOMO METAL MINING CO., LTD.) having a crystalline diameter of 17.8 nm, specific surface area of 54.5 m$^2$/g, average particle diameter of 19.0 nm were mixed and stirred, which were then subjected to dispersion processing by a medium stirring mill, to thereby prepare a dispersion liquid of ZnO particles having average dispersion particle diameter of 100 nm (liquid A).

Subsequently, 2000 g of liquid A, and 400 g of silicone resin (TSR127B (50% of nonvolatile matter) produced by Momentive Performance Material Inc. Japan) having alkoxysilyl group (Si—OR) and/or silanol group (Si—OH) and having methyl group as an organic substitution group, 1580 g of isopropyl alcohol, and 20 g of catalyst (YC9103 produced by Momentive Performance Material Inc. Japan) were mixed and stirred, to thereby obtain a mixed solution.

Subsequently, the mixed solution was vacuum-dried while subjecting to heat treatment for 2 hours at 120° C. and the solvent was evaporated, to thereby obtain a dried solidified body, then the obtained dried solidified body was subjected to dry-type pulverization, to thereby obtain the surface treated zinc oxide particles with each surface zinc particle coated with a silane compound in a weight of about ½ times as much as the zinc oxide particles.

528 g of the surface treated zinc oxide particles, 2.5 g of dispersant agent (acrylic resin-based polymer dispersant agent) 41.25, and 1259.5 g of toluene were mixed and stirred, which were then subjected to dispersion processing by the medium stirring mill, to thereby prepare the dispersion liquid with an average dispersion particle diameter of each surface treated zinc oxide particle set to 100 nm.

0.93 g of the dispersion liquid, 0.6 g of ultraviolet curing resin (UV3701 produced by TOAGOSE Inc.), and 2.47 g of toluene were mixed, to thereby obtain the zinc oxide particle dispersion liquid with a ratio of [ZnO]:[solid matter of the ultraviolet curing resin] satisfying 1:4.3. The surface of a glass substrate was coated with the zinc oxide particles dispersion liquid in a thickness of 3 mm by using a bar coater, to thereby form a film. The film was irradiated with ultraviolet ray using a high-pressure mercury lamp after evaporating the solvent by drying the film for 1 minute at 70° C., to thereby cure the film.

Optical characteristics of the prepared film was measured by transmittance of the light with the wavelength of 200 to 2100 nm, by using a spectrophotometer produced by Hitachi Ltd., and ultraviolet ray transmittance, visible light transmittance, solar light transmittance were calculated based on JIS R 3106. Further, the haze value of the film was measured based on JIS K 7105. The result thereof is shown in table 1.

Further, the suppression effect of the photocatalytic activity of the manufactured film was evaluated. A ultraviolet irradiation device (SUV-W131 produced by IWASAKI ELECTRIC CO., LTD.) was used to perform irradiation of the ultraviolet ray at 100 mW/cm$^2$ for 20 hours. The optical characteristics of the film after irradiation of the ultraviolet ray was measured in the same way as described above. The result thereof is shown together in table 1.

Further, table 1 shows the result obtained by the following example 2, and comparative examples 1 to 4, together.

Example 2

2000 g of the liquid A, and 400 g of the silicone resin (YR3370(50% of diluted product was used) produced by Momentive Performance Material Inc. Japan) having alkoxysilyl group (Si—OR) and/or silanol group (Si—OH) and having methyl group and phenyl group as organic substitution groups, 1580 g of isopropyl alcohol, and 20 g of catalyst (YC9103 produced by Momentive Performance Material Inc. Japan) were mixed and stirred, to thereby obtain a mixed solution.

Subsequently, the mixed solution was vacuum-dried while subjecting to heat treatment for 2 hours at 120° C. and the solvent was evaporated, to thereby obtain the dried solidified body, then the obtained dried solidified body was subjected to dry-type pulverization, to thereby obtain the surface treated zinc oxide particles with each surface zinc particle coated with a silane compound in a weight of about ½ times as much as the zinc oxide particles.

528 g of the surface treated zinc oxide particles, 41.2.5 g of dispersant agent (acrylic resin-based polymer dispersant agent), and 1259.5 g of toluene were mixed and stirred, which were then subjected to dispersion processing by the medium stirring mill, to thereby prepare the dispersion liquid with an average dispersion particle diameter of each surface treated zinc oxide particle set to 110 nm.

0.93 g of the dispersion liquid, 0.6 g of ultraviolet curing resin (UV3701 produced by TOAGOSE Inc.), and 2.47 g of toluene were mixed, to thereby obtain the zinc oxide particle dispersion liquid with a ratio of [ZnO]:[solid matter of the ultraviolet curing resin] satisfying 1:4.3. The surface of the glass substrate was coated with the zinc oxide particles dispersion liquid in a thickness of 3 mm by using the bar coater, to thereby form the film. The film was irradiated with ultraviolet ray using a high-pressure mercury lamp after evaporating the solvent by drying the film for 1 minute at 70° C., to thereby cure the film.

Table 1 shows the result of measuring the evaluation of the optical characteristics of the film and the suppression effect of the photocatalytic activity by the same method as the example 1.

Comparative Example 1

1.47 g of the liquid A, 1.26 g of the ultraviolet curing resin (UV3701 produced by TOAGOSE Inc.), and 1.47 g of toluene were mixed, to thereby obtain a coating liquid with a ratio of [ZnO]:[solid matter of the ultraviolet curing resin] satisfying 1:4.3. The surface of the glass substrate was coated with the coating liquid in a thickness of 3 mm by using the bar coater, to thereby form the film. The film was irradiated with ultraviolet ray using a high-pressure mercury lamp after evaporating the solvent by drying the film for 1 minute at 70° C., to thereby cure the film.

Table 1 shows the result of measuring the evaluation of the optical characteristics of the film and the suppression effect of the photocatalytic activity by the same method as the example 1.

Comparative Example 2

2000 g of the liquid A, and 400 g of the silicone resin (TSR127B produced by GE Toshiba Silicone Inc.), 1580 g of isopropyl alcohol, and 20 g of catalyst (YC9103 produced by GE Toshiba Silicone Inc.) were mixed and stirred.

Subsequently, the liquid was vacuum-dried while being heated for 2 hours at 250° C., then the solvent was evaporated and the obtained powder body was subjected to dry-type pulverization, to thereby obtain the zinc oxide particles particle coated with a silane compound in a weight of about ½ times as much as the zinc oxide particles.

528 g of the zinc oxide particles coated with the silane compound, 412.5 g of the dispersant agent (acrylic resin-based polymer dispersant agent), and 1259.5 g of toluene were mixed and stirred, which were then subjected to dispersion processing by the medium stirring mill, to thereby prepare the dispersion liquid with average dispersion particle diameter of 100 nm.

0.93 g of the dispersion liquid and 0.6 g of the ultraviolet curing resin (UV3701 produced by TOAGOSE Inc.), and 2.47 g of toluene were mixed, to thereby obtain the coating liquid with a ratio of [ZnO]:[solid matter of the ultraviolet curing resin] satisfying 1:4.3. The surface of a glass substrate was coated with the coating liquid in a thickness of 3 mm by using a bar coater, to thereby form the film. The film was irradiated with ultraviolet ray using a high-pressure mercury lamp after evaporating the solvent by drying the film for 1 minute at 70° C., to thereby cure the film.

Table 1 shows the result of measuring the evaluation of the optical characteristics of the film and the suppression effect of the photocatalytic activity by the same method as the example 1.

Comparative Example 3

500 g of the liquid A, 10 g of ethyl acetoacetatoaluminum diisopropylate (product name: Almichelate ALCH produced by KAWAKEN Fine Chemical Inc.), and 96.4 g of isopropyl alcohol were mixed and stirred, which were then subjected to dispersion processing by using a ultrasonic homogenizer, to thereby obtain the dispersion liquid.

120 g of water was dropped while stirring the dispersion liquid, then 173.6 g of tetraethoxysilane (ethyl orthosilicate, 28.8% of $SiO_2$ reduced quantity, by TAMA CHEMICALS CO., LTD.) which was then stirred for 15 hours at 20° C., and this liquid was heated and matured for 2 hours at 70° C.

Subsequently, the matured liquid was vacuum-dried while being heated for 2 hours at 120° C., then the solvent was evaporated, and the obtained powder body was subjected to dry-type pulverization, to thereby obtain the zinc oxide particle coated with about 5 wt % of $Al_2O_3$ and $SiO_2$ in a weight of about ½ times as much as the zinc oxide particles.

226.5 g of $Al_2O_3/SiO_2$ coated zinc oxide particles, 187.5 g of dispersant agent (acrylic resin-based polymer dispersant agent), and 586 g of toluene were mixed and stirred, which were then dispersed by a medium stirring mill, to thereby prepare dispersion liquid with an average dispersion particle diameter of 100 mm.

0.93 g of the dispersion liquid, 0.6 g of ultraviolet curing resin (UV3701 produced by TOAGOSE Inc.), and 2.47 g of toluene were mixed, to thereby obtain coating liquid with the ratio of [ZnO]:[solid matter of the ultraviolet curing resin] satisfying 1:4.3. The surface of the glass substrate with a thickness of 3 mm was coated with the coating liquid, to thereby obtain a film. The film thus obtained was dried for 1 minute at 70° C., then the solvent was evaporated, and ultraviolet ray was emitted thereto by using a high pressure mercury lamp, to thereby cure the film.

Table 1 shows the result of measuring the evaluation of the optical characteristics of the film and the suppression effect of the photocatalytic activity by the same method as the example 1.

Comparative Example 4

Subsequently, 2000 g of the liquid A, and 200 g of hydrogen polysiloxane (TSF484 produced by Momentive Performance Material Inc. Japan), 1790 g of IPA, and 10 g of catalyst (CW80 produced by Momentive Performance Material Inc. Japan) were mixed and stirred, to thereby obtain a mixed solution.

The mixed solution was vacuum-dried while being heated for 2 hours at 250° C., then the solvent was evaporated, and the obtained powder body was subjected to dry-type pulverization, to thereby obtain the zinc oxide particle coated with the silane compound of ½ times as much as the zinc oxide particles.

528 g of the zinc oxide particles coated with the silane compound, 412.5 g of dispersant agent (acrylic resin-based polymer dispersant agent), and 1259.5 g of toluene were mixed and stirred, which were dispersed by the medium stirring mill, to thereby prepare the dispersion liquid with average dispersion particle diameter of 100 nm.

0.93 g of the dispersion liquid, 0.6 g of ultraviolet curing resin (UV3701 produced by TOAGOSE Inc.), and 2.47 g of toluene were mixed, to thereby obtain the coating liquid with the ratio of [ZnO]:[solid matter of the ultraviolet curing resin] satisfying 1:4.3. The surface of the glass substrate was coated with the coating liquid in the thickness of 3 mm by using a bar coater, to thereby form the film.

The film was irradiated with ultraviolet ray using a high-pressure mercury lamp after evaporating the solvent by drying the film for 1 minute at 70° C., to thereby cure the film.

Table 1 shows the result of measuring the evaluation of the optical characteristics of the film and the suppression effect of the photocatalytic activity by the same method as the example 1.

TABLE 1

|  | Initial optical characteristics | | | | Optical characteristics after 20 hours irradiation of ultraviolet ray | | | | |
| --- | --- | --- | --- | --- | --- | --- | --- | --- | --- |
|  | UV transmittance (%) | Visible light transmittance (%) | Solar light transmittance (%) | Haze (%) | UV transmittance (%) | Visible light transmittance (%) | Solar light transmittance (%) | Haze (%) | Δ Haze (%) |
| Example 1 | 10.65 | 89.77 | 85.07 | 0.4 | 11.72 | 89.92 | 85.31 | 0.2 | −0.2 |
| Example 2 | 13.88 | 89.28 | 83.34 | 0.8 | 16.04 | 89.59 | 83.51 | 0.4 | −0.4 |
| Com* Example 1 | 6.81 | 89.09 | 85.08 | 0.4 | 6.07 | 78.92 | 80.63 | 10 | 9.6 |
| Com* Example 2 | 9.54 | 87.94 | 84.5 | 1.7 | 10.6 | 81.61 | 81.58 | 7.8 | 6.1 |
| Com* Example 3 | 13.75 | 88.52 | 84.82 | 0.9 | 17.46 | 87.88 | 84.58 | 6.8 | 5.9 |
| Com* Example 4 | 11.69 | 88.79 | 85.09 | 1.9 | 13.66 | 84.32 | 83.27 | 9.4 | 7.5 |

Com* . . . Comparative

Conclusion of Examples 1, 2, and Comparative Examples 1 to 4

From the result described in table 1, the inventors of the present invention note the difference of haze values (described as Δ haze value hereafter) before/after irradiation of the ultraviolet ray for evaluating the suppression effect of the photocatalytic activity, in films according to each example and comparative example.

Then, it was found that Δ haze values of the films according to examples 1 and 2 were suppressed to 0.5% or less which was further smaller than 5%. Meanwhile, all Δ haze values of the films according to comparative examples 1 to 4 exceed 5%. It can be considered that the difference of the Δ haze values between the examples and comparative examples was caused by whether or not the inactivation of the photocatalytic activity was performed. Accordingly, it appears that the photocatalytic activity of the surface treated zinc oxide particles according to the examples 1 and 2 were inactivated.

The invention claimed is:

1. A window material, characterized by being a film or a board with a thickness of 0.1 μm to 50 mm, and comprising surface treated zinc oxide particles dispersed in a solid medium,
    wherein the surface treated zinc oxide particles are obtained through a surface treated zinc oxide particles precursor and further through a dried body according to a manufacturing method comprising:
    a first step of mixing a dispersion liquid with zinc oxide particles dispersed in a solvent, and a silicone resin having polysiloxane bond with at least one or more silicon atoms having a silanol group (Si—OH) and/or alkoxy silyl group (Si—OR, wherein R is alkyl group); then obtaining a mixed solution containing a surface treated zinc oxide particles precursor, with the silicone resin adsorbed on a surface of the zinc oxide particles and the solvent, and drying and solidifying the mixed solution by removing the solvent from the mixed solution and applying heat treatment thereto, to thereby manufacture a dried body,
    wherein the silicone resin adsorbed on the surface of the zinc oxide particles has a three-dimensional siloxane bond; and
    a second step of pulverizing the dried body, to thereby manufacture the surface treated zinc oxide particles.

2. The window material according to claim 1, wherein the solid medium is either resin or glass.

3. The window material according to claim 2, wherein the resin as the solid medium is selected from the group consisting of fluorine resin, polyethylene terephthalate resin, acrylic resin, polyamide resin, vinyl chloride resin, polycarbonate resin, olefin resin, stylene resin, cellulose derivative, urethane resin, melamine resin, polyimide resin, and phenol resin.

4. The window material according to claim 2, wherein the glass as the solid medium is obtained by a sol-gel method.

* * * * *